March 15, 1966  H. J. SOSSNA  3,240,195
AUTOMATICALLY HYDRAULICALLY ADJUSTING VALVE
PLUNGER FOR PISTON ENGINES
Filed Feb. 2, 1965
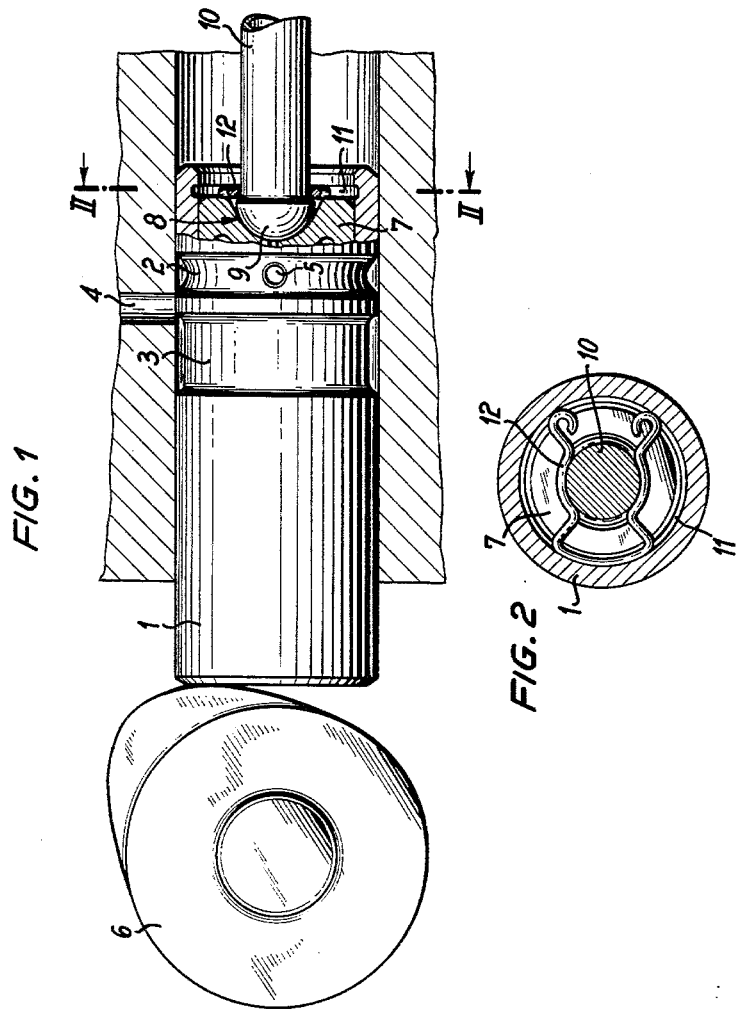
INVENTOR
HANS JÜRGEN SOSSNA
BY
*Hammond & Littell*
ATTORNEYS 3,240,195
AUTOMATICALLY HYDRAULICALLY ADJUSTING VALVE PLUNGER FOR PISTON ENGINES
Hans Jürgen Sossna, Ingolstadt (Danube), Germany, assignor to Motomak Motorenbau, Maschinen- und Werkzeugfabrik, Konstruktionen G.m.b.H., Ingolstadt, Germany, a corporation of Germany
Filed Feb. 2, 1965, Ser. No. 429,841
Claims priority, application Germany, Feb. 12, 1964, M 59,884
2 Claims. (Cl. 123—90)

The invention relates to an automatically hydraulically adjustable valve plunger for piston engines which may be readily disassembled from the engine.

The valve plunger consists of two longitudinally slidable, telescoping elements in engagement with each other with essentially constant exterior contour, the travel of the inner plunger element cooperating with the spherical end of a valve rod toward the valve rod being defined by means of a retaining ring in relation to the outer plunger elements. The two longitudinally slidable elements are closed on their extreme ends and enclose in the interior, as well known, a pressure chamber connected by means of a check valve with an antechamber accommodated in one of the two elements. This antechamber is provided with pressure oil from the lubrication cycle of the engine through bores in the plunger element. The action of such a valve plunger consists, as it is well known, in that the valve plunger disposed between a drive cam on one end and a valve rod on the other end, by means of the two elements in longitudinal sliding engagement, adjusts any free motion in the valve mechanism.

Hydraulic valve plungers of the type intended are described for example in my copending application Serial No. 347,783, filed February 27, 1964, now Patent No. 3,177,857.

In hydraulic valve plungers of this type the valve rod abuts against a ball socket on the end wall of the inner plunger element without being fixedly secured to the socket. Such loose coupling is quite feasible, as only those compressing forces necessary for the opening of the valve need to be transmitted from the drive cam across the valve plunger and valve rod. No tension forces are likely to occur. For the purpose of removing such a valve plunger it is necessary to disassemble the entire motor, as the valve plunger can be lifted out of its sliding position only from the side of the cam, that is, toward the center of the motor. Any repair or any exchange of the valve plunger likely to be required, therefore, turns out to be a very time-consuming and costly procedure. The valve plungers cannot be taken out of their sliding position from the side of the valve rod because, first they are only in loose contact with the valve rod, and in addition, the dimensions of the engine construction do not permit grasping the valve plunger with a tool or by hand to lift it out in that manner.

It is, therefore, an object of this invention to make possible the removal of the valve plunger without disassembling the entire motor for this purpose. To achieve this, according to the invention, a valve rod is connected with the valve plunger in such a way that the latter may be removed with the aid of the valve rod from its guide in the motor housing from the side in the direction of the valve rod. The valve rod is engaged with the valve plunger so that said valve rod is encircled by a retaining ring behind its spherical end in a way that a removal of the valve rod from the valve plunger is prevented. The guard ring provides here a double function. For one thing, it limits the movement of the inner plunger element, cooperating with the spherical end of the valve rod, toward the valve plunger relative to the outer plunger element. On the other hand, the guard ring according to the invention connects the valve rod with the valve plunger in such manner, that a removal of the valve rod from the valve plunger is made possible. For this purpose the safety ring is formed so that it allows slight angular positions of the valve rod in relation to the valve plunger, as such may occur during operation.

The particular advantage of this type of construction is the fact, that when the removal of a valve plunger is desired, it may be withdrawn in simple manner together with the valve rod from the plunger guide, without disassembling the motor. One condition for this is that the valve plunger possesses an essentially constant exterior contour which, however, may be provided with annular grooves which, for example, provide for the oil supply to the plunger interior.

The drawing illustrates an embodiment of the construction according to the invention wherein, FIG. 1 shows a sectional view through a valve plunger;

FIG. 2 shows a view through the valve plunger along the line II—II of FIG. 1.

In FIG. 1, the outer element of the two plunger elements in telescopic engagement with each other and sliding longitudinally endwise against each other, is designated with numeral 1, said outer element possessing essentially a constant exterior contour. This is interrupted only by annular slots or grooves 2 and 3, serving to supply the valve plunger with lubricant. The outer plunger element 1 accommodates the inner plunger element 7 arranged in endwise longitudinal sliding position and comprising a ball socket 8 which engages the spherical head 9 of the valve rod 10. The diameter of said spherical head 9 is greater than that of the valve rod itself.

The outer plunger element 1 is provided with an annular groove 11 at its head facing the valve rod 10. In said groove 11 a guard ring 12 has been inserted in order, for one thing, to define the travel of the inner plunger element 7 in relation to the outer plunger element 1 in the direction toward the valve rod 10. On the other hand, guard ring 12 encircles the valve rod 10 behind its spherical head 9 in such manner that a removal of the valve rod 10 from the valve plunger is prevented. However, a certain degree of flexibility between valve rod and valve plunger remains.

FIG. 2 illustrates a type of construction for the guard ring 12 which makes possible the accomplishment of these two functions. The clearance between safety ring 12 and valve rod 10 is chosen in such manner that the valve rod together with the inner plunger element 7 is adapted to travel into the outer plunger element 1 without any difficulty as may be required by the adjustment of length in the valve structure which is not illustrated in detail. On the other hand, a slipping out of the valve rod is only possible as far as to the abutment of the spherical head 9 against the safety ring 12.

For carrying out the invention, the safety ring 12 has been shown to be constructed in the manner as illustrated in FIG. 2. Other types of construction are, however, conceivable which could meet the problem.

It is also feasible to provide the spherical head 9 of the valve rod with the same diameter as effected for the valve rod 10. In this case it would be necessary to arrange a slot in the valve rod adjacent to the spherical head 9 for engagement with the safety ring 12.

While I have disclosed certain specific embodiments and preferred modes of practice of my invention, it will be understood that this is solely for purposes of illustration and to enable persons skilled in the art to better understand and practice the invention. It will be understood that various changes and modifications may be made without departing from the spirit of the disclosure or the scope of the appended claims.

I claim:

1. An automatically hydraulically adjustable valve plunger for piston engines adapted to cooperate with a valve rod, said plunger comprising two telescoping cylindrical elements in longitudinal sliding engagement, said elements having substantially constant outer contours, the extreme ends of said cylindrical elements being closed, the outer end of said inner element having a concave hemispherical shape being adapted to make contact with the convex hemispherical end of a valve rod, clamping means adapted to fit loosely around the stem of said valve rod behind said hemispherical end, means to retain said clamping means at the open end of said outer cylindrical element whereby the movement of said rod and inner cylinder is restricted in a direction out of said outer cylinder but not into said outer cylinder, and separation of said rod from said plunger is prevented.

2. An automatically hydraulically adjustable valve plunger for piston engines adapted to cooperate with a valve rod, said plunger comprising two telescoping cylindrical elements in longitudinal sliding engagement, said elements having substantially constant outer contours, the extreme ends of said cylindrical elements being closed, the outer end of said inner element having a concave hemispherical shape being adapted to make contact with the convex hemispherical end of a valve rod, an annular recess on the inner surface at the open end of said outer cylindrical element, spring clip means fitting around said valve rod behind said hemispherical end and into said recess to restrict the movement of said rod and inner cylinder in a direction out of said outer cylinder but not into said outer cylinder and further to prevent separation of said rod from said plunger.

References Cited by the Examiner

UNITED STATES PATENTS 2,691,367  10/1954  Thoren _____ 123—90

FOREIGN PATENTS 830,433  2/1952  Germany.

MARK NEWMAN, *Primary Examiner.*

FRED E. ENGELTHALER, *Examiner.*